United States Patent [19]
Pasch et al.

[11] Patent Number: 5,595,434
[45] Date of Patent: *Jan. 21, 1997

[54] WAND ATTACHMENT

[76] Inventors: Ricky C. Pasch, 915 W. County B2, Roseville, Minn. 55113; David R. Thomas, 10105 152nd St. North, Hugo, Minn. 55038

[*] Notice: The term of this patent shall not extend beyond the expiration date of Pat. No. 5,383,103.

[21] Appl. No.: 373,649

[22] Filed: Jan. 17, 1995

Related U.S. Application Data

[63] Continuation of Ser. No. 124,724, Sep. 21, 1993, Pat. No. 5,383,103.

[51] Int. Cl.$^6$ ............................................. F21L 15/00
[52] U.S. Cl. ................ 362/102; 362/109; 362/186; 40/555; 446/485; 403/320; 403/341
[58] Field of Search ....................... 362/102, 109, 362/186, 190, 191, 352; 84/477 B; 403/320, 341; 285/386, 387; 116/26; 40/586, 555; 446/473, 485

[56] References Cited

U.S. PATENT DOCUMENTS

| | | | |
|---|---|---|---|
| 1,463,461 | 7/1923 | Davis | 285/386 |
| 2,591,269 | 4/1952 | Lehoczki | 177/329 |
| 2,823,300 | 2/1958 | Graubner | 240/10.6 |
| 3,787,675 | 1/1974 | Rushing et al. | 240/10.6 |
| 3,877,177 | 4/1975 | Taniguchi | 51/131 |
| 4,208,701 | 6/1980 | Schock | 362/202 |
| 4,231,077 | 10/1980 | Joyce et al. | 362/32 |
| 4,697,228 | 9/1987 | Mui et al. | 362/352 |
| 4,877,270 | 10/1989 | Phillips | 285/18 |
| 4,914,748 | 4/1990 | Schlotter, IV et al. | 362/109 |
| 5,165,781 | 11/1992 | Orah | 446/485 |
| 5,324,227 | 6/1994 | Yuh-Ching | 446/473 |

Primary Examiner—Ira S. Lazarus
Assistant Examiner—Sara Sachie Raab
Attorney, Agent, or Firm—Nawrocki, Rooney & Sivertson, P.A.

[57] ABSTRACT

A flashlight wand attachment including a wand member having a truncated generally conical portion and an opposing member. The attachment also includes threads for fastening the wand member to the opposing member when the wand member is disposed at one end of a wide portion or lamp housing of a handle member or flashlight, and the opposing member is disposed at an opposite end of the wide portion or lamp housing. Fastening the wand member to the opposing member in this way operably connects the wand attachment to the handle member. The present invention also includes a method of attaching a wand attachment to a flashlight.

2 Claims, 2 Drawing Sheets

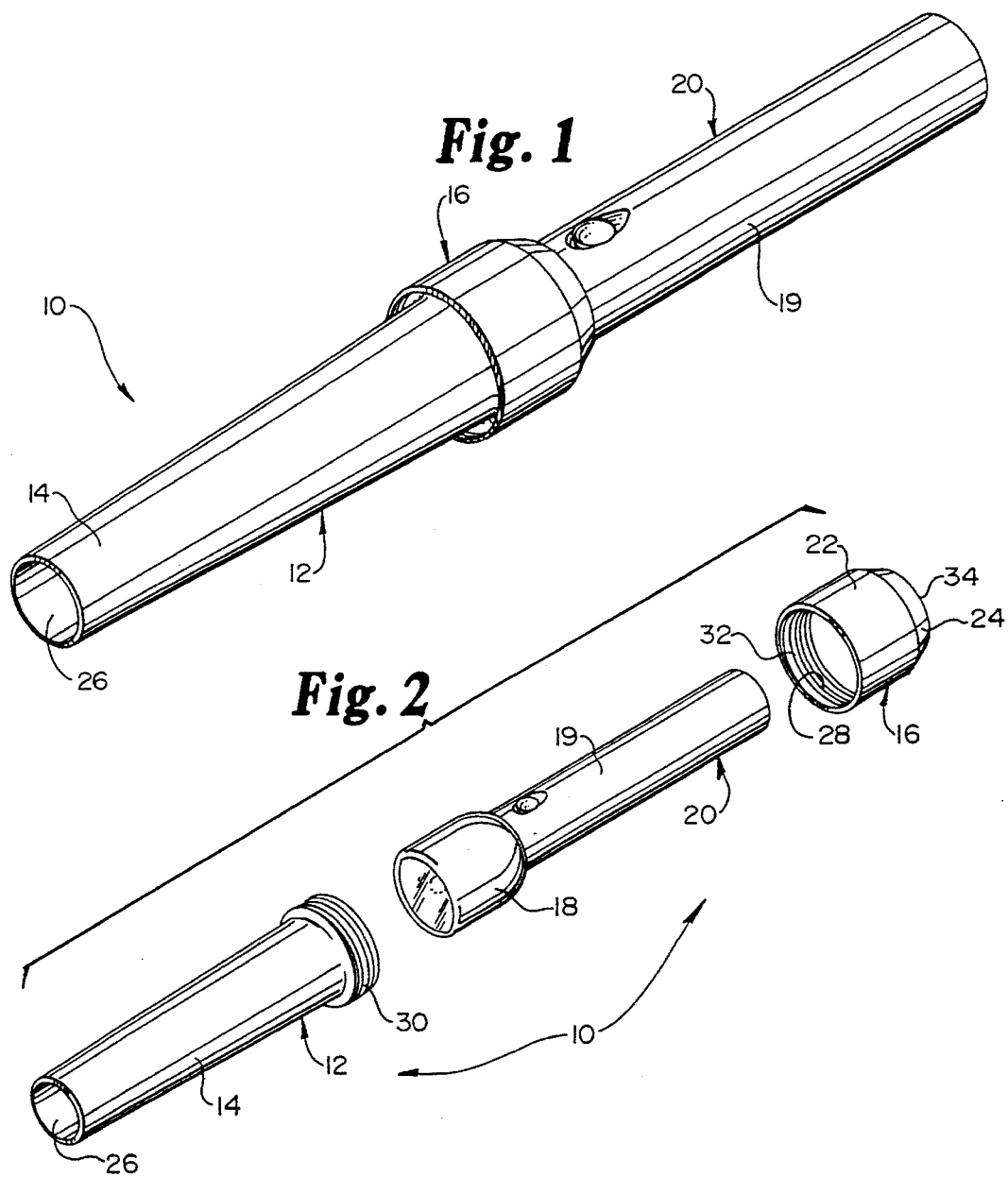

WAND ATTACHMENT

This is a continuation of application Ser. No. 08/124,724 filed on Sep. 21, 1993 now U.S. Pat. No. 5,383,103 issued on Jan. 17, 1995.

TECHNICAL FIELD

The present invention pertains to a wand attachment for a flashlight or handle.

BACKGROUND OF THE INVENTION

Flashlight wand attachments are often used by police officers or airport ground crews to direct motor vehicle or airplane traffic, respectively. The wand attachments usually have a truncated, generally conical shaped member. The conical shaped member is preferably fabricated from a brightly colored translucent material and has a longitudinal opening extending from a wide end to a narrow truncated end. The wide end can be operatively connected to a lamp housing of a flashlight such that a beam of light emanating from the lamp housing can be directed into the longitudinal opening to illuminate the translucent conical member.

When the conical member is illuminated, it is particularly useful for directing traffic at night. The illuminating conical member is highly visible, and the conical shape acts as a pointer with the narrow truncated end indicating the desired direction of vehicle movement.

The wand attachment can also be used for directing traffic in daylight. During the day, the lamp, if one is used, need not be turned on because the brightly colored conical member is highly visible without illumination.

Prior wand attachments of a type as disclosed by Mui, et al. in U.S. Pat. No. 4,697,228 include a conical member having an internally threaded wide end. To fasten the conical member to a lamp housing, the wide end is threaded directly over an externally threaded portion of the lamp housing. When different flashlights are used, the diameter of the threaded portion of the lamp housing or spacing of the threads may vary. Consequently, the diameter and/or threaded spacing of the wide end of the .conical member has to be able to be adapted accordingly. Consequently, for each different type of flashlight, a different conical member may have to be fabricated having threads sized to engage the threads on the lamp housing.

Another type of wand attachment includes a conical member having a wide end intended to be friction fit over a lamp housing. A metal retention ring is provided around the outside of the wide end of the conical member to provide an inwardly directed clamping force to ensure a tight friction fit.

Like the wand attachment disclosed by Mui, et al. this latter type of wand attachment is designed to fit a particular lamp housing. If a flashlight having a different lamp housing is used, a different conical member configured to fit the different lamp housing would have to fabricated. Concurrently, a different metal retention ring would also have to be used.

It is to these problems and dictates of the prior art that the present invention is directed. It is an improved wand attachment for mounting to an elongated implement such as a flashlight.

SUMMARY OF THE INVENTION

The present invention pertains to an improved wand attachment for an implement having an elongated grip and an expanded diameter portion which can be disposed proximate one end of the grip. The improved wand attachment can be fastened, for example, to several different size lamp housings of flashlights. The different size lamp housings might include those, for example, of the MagCharger™ flashlights or the Excalibre™ series of flashlights manufactured by Streamlight, Inc. For daytime use, the wand might also be fastened to a handle member having a shape similar to a flashlight, but not including a lamp and batteries.

The wand attachment of the present invention includes a wand member which can have a truncated, generally conical portion. The wand attachment also includes an opposing member and means for fastening the wand member to the opposing member. When the wand member is fastened to the opposing member, the wand member is disposed to one side of a lamp housing of a flashlight, in a flashlight application, and the opposing member is disposed on an opposite side of the lamp housing.

The opposing member may be a hollow collar member having a generally cylindrical portion and a truncated conical portion extending from one end of the cylindrical portion. The diameter of the conical portion generally decreases away from the cylindrical portion.

The wand member may be made from a translucent material and would typically include a longitudinal opening therethrough. Such a wand member may be attached to the lamp housing of the flashlight to illuminate the wand member.

The fastening means may include threading disposed on an inside surface of the collar member at an end thereof opposite the conical portion. The wand member may also include external threading to enable mating with the threading of the collar member.

In one embodiment, the collar member can have two oppositely disposed, coaxial openings. One opening is wider than the other. The wider opening has a diameter approximately equal to, but greater than, the maximum width of the lamp housing. The diameter of the other opening is less than the maximum width of the lamp housing and greater than the width of the grip.

The wand attachment preferably includes a multiple internal diameter wand member for attaching the wand attachment to at least two different widths of lamp housings. The wand attachment also preferably includes variable length attachment means for attaching the wand attachment to at least two different length lamp housings.

The present invention is thus an improved wand attachment for mounting, for example, to an elongated implement such as a flashlight. More specific features and advantages obtained in view of the features will become apparent with reference to the DETAILED DESCRIPTION OF THE INVENTION, appended claims, and accompanying drawing figures.

BRIEF DESCRIPTION OF THE DRAWINGS

FIG. 1 is a perspective view of a wand attachment in accordance with the present invention in combination with a flashlight;

FIG. 2 is an exploded view of the wand attachment and flashlight of FIG. 1;

DETAILED DESCRIPTION OF THE INVENTION

Figure 3:
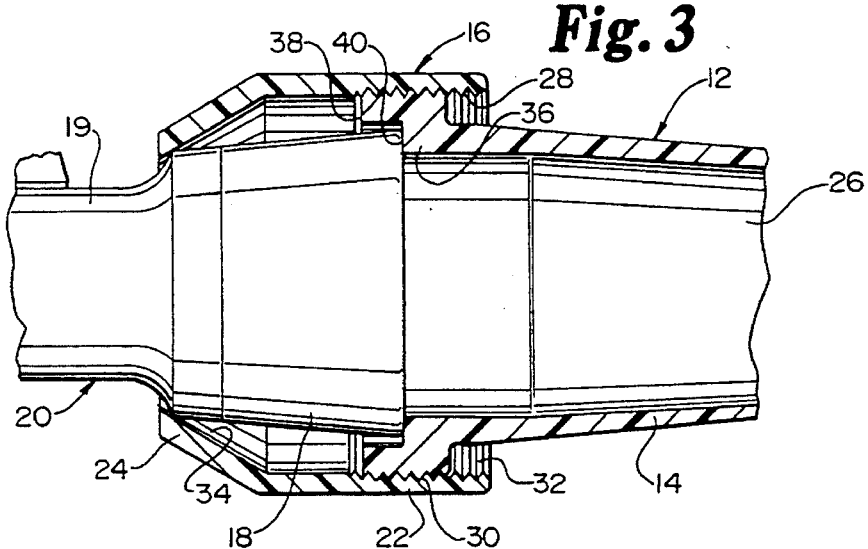
FIG. 3 is a cross-section of the wand attachment fastened to a first type of flashlight.

Referring now to the drawings wherein like reference numerals designate like elements throughout the several views, FIGS. 1 and 2 show a wand attachment 10 in accordance with the present invention in combination with a flashlight 20. Wand attachment 10 is shown as including a wand member 12 having a truncated conical portion 14.

Wand attachment 10 also includes an opposing member 16. Wand attachment 10, further, employs fastening means for fastening wand member 12 to opposing member 16.

When fastening wand member 12 to opposing member 16, wand member 12 is disposed at one end of an expanded portion of a handle member, or a lamp housing 18 of a flashlight 20, and opposing member 16 is disposed at an opposite end thereof, having been slid over a grip 19. Flashlight wand attachment 10 can be fastened to several different size lamp housings 18. The different sizes lamp housings might include those of the MagCharger™ flashlight, the Excalibre™ series of flashlights manufactured by Streamlight, Inc., or any other flashlight having similarly sized and configured lamp housing.

Wand member 12 and opposing member 16 are preferably made from blow molded plastic. Other suitable materials and methods of manufacture may be used and are well known in the art. Wand member 12 is preferably made from translucent brightly colored, for example red or yellow, plastic.

Opposing member 16 may be a hollow collar member having a generally cylindrical portion 22 and a truncated conical portion 24 extending from one end of cylindrical portion 22. Conical portion 24 generally decreases in diameter away from cylindrical portion 22.

Wand member 12 preferably includes a longitudinal opening 26 therethrough. When wand member 12 is attached to lamp housing 18, light emitted from lamp housing 18 of flashlight 20 into opening 26 illuminates the translucent wand member 12.

In one embodiment, fastening is accomplished by means of a threaded portion 28 disposed on an inside surface of collar member 16 at an end thereof opposite conical portion 22. Wand member 12 includes an externally threaded portion 30 for mating with threads 28.

The generally hollow collar member 16 may have two oppositely disposed openings 32 and 34. Opening 32 is wider than opening 34. The diameter of opening 32 is approximately equal to, but greater than, the maximum diameter of lamp housing 18. The diameter of opening 34 is less than the maximum diameter of lamp housing 18 and greater than the diameter of a grip portion 19 of flashlight 20.

Wand attachment 10 preferably includes attachment means for attaching wand attachment 10 to at least two different diameter lamp housings 18. Such attachment means employs a spacer step 36, which is shown as forming a proximal end of wand member 12, which has multiple inner diameters. Spacer step 36 is within wider opening 32 of collar member 16 between collar member 16 and lamp housing 18 to accommodate at least two different width lamp housings 18. Spacer step 36 is preferably cylindrical and integrally formed with conical portion 14 of wand member 12.

Figure 4:
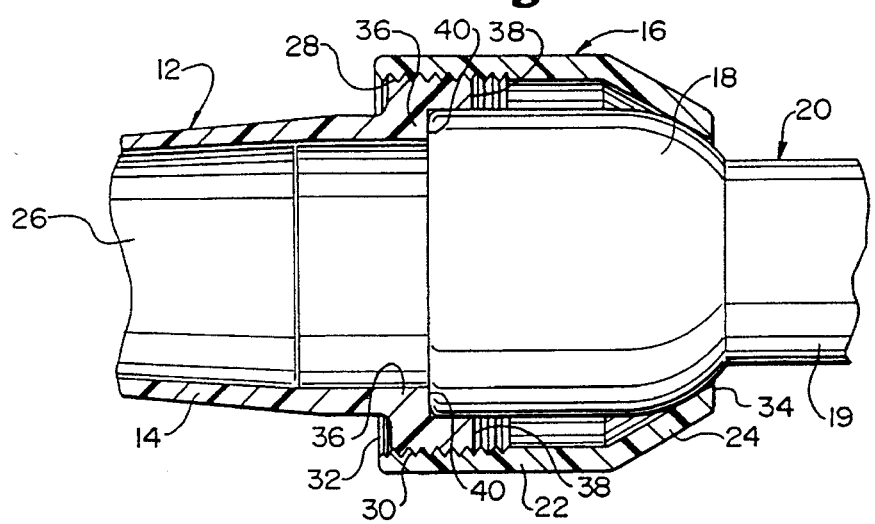
FIG. 4 is a cross-section of the wand attachment fastened to a second type of flashlight.
Figure 5:
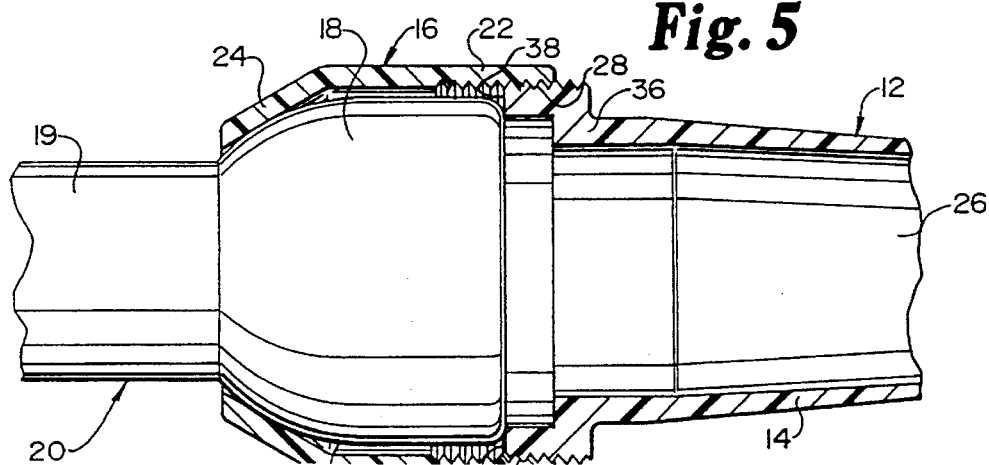
FIG. 5 is a cross-section of a wand attachment fastened to a third type of flashlight.

As shown in FIGS. 3 and 4 spacer step 16 is defined between collar member 36 and lamp housing 18 to reduce the width or diameter of opening 32 of collar member 16. In FIG. 5, flashlight 20 has a wider lamp housing 18 with a width approximately equal to, but less than, the width of opening 32 of collar member 16. In that figure, lamp housing 18 is wide enough that spacer step 36 need not be interposed between collar member 16 and lamp housing 18.

Wand attachment 10 may also include means to enable attaching wand attachment 10 to at least two different length lamp housings 18. As shown in FIGS. 3–5, the attachment means preferably include a shoulder 38 of spacer step 36 and cooperating with a shoulder 40 of conical portion 14 both of wand member 12.

As shown in FIGS. 3 and 4 an end of lamp housing 18 abuts shoulder 40 of conical portion 14 to hold lamp housing 18 between wand member 12 and collar member 16. Lamp housing 18, in FIG. 3, is shorter and has a somewhat different configuration than lamp housing 18, in FIG. 4. Thus, wand member 12 is inserted or threaded further into collar member 16 in FIG. 3 than in FIG. 4.

As shown in FIG. 5, an end of lamp housing 18 abuts shoulder 38 of spacer portion 36. In FIG. 5 wand member 12 is inserted or threaded far enough into collar member 16 to hold lamp housing 18 between shoulder 38 and collar member 16.

In use, wand attachment 10 is attached to flashlight 20 by placing wand member 12 at the distal end of lamp housing 18 of flashlight 20. Opposing member or collar member 16 is positioned at an opposite end of lamp housing 18 by sliding collar member 16 over grip 19. Then wand member 12 is threaded onto opposing member or collar member 16. It will be understood that wand attachment 10 might also be fastened to handle member for daytime use, wherein the handle member has a shape similar to flashlight 20 but does not include a lamp and batteries.

To secure wand portion 12 to opposing member 16, wand member 12 is threaded into collar member 16. A shoulder 38, 40 of wand member 12 is abutted against an end of lamp housing 18 to hold lamp housing 18 between wand member 12 and collar member 16. As discussed above, spacer step 36 may be received between housing 18 and collar member 16 to reduce the effective width of opening 32.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A wand attachment for a handle portion having a first diameter, and an axially aligned expanded portion having a second diameter larger than said first diameter, comprising:

a wand member having proximal and distal ends;

an opposing collar member receivable over said handle portion to axially engage one axial end of said expanded portion;

means for attaching said wand member to said opposing collar member when said wand member is disposed in engagement, at said proximal end thereof, with an opposite axial end of said expanded portion and said opposing collar member, having a central longitudinal axis, is disposed in engagement with said one axial end of said expanded portion so that said wand attachment is secured to said expanded portion; and multiple length means for interchangeably attaching said wand attachment to at least two different handle portions with expanded portions having different lengths, said multiple length means being carried by said wand member proximate said proximal end thereof, and a central longitudinal axis of said expanded portion being generally coaxial with a central longitudinal axis of said handle member.

2. A wand attachment for mounting to an elongated implement, said implement having a narrow diameter portion and an expanded diameter portion, said expanded diameter portion having a forwardly facing shoulder and a rearwardly facing shoulder disposed proximate the narrow diameter portion, comprising:

a wand member engageable against said forwardly facing shoulder;

an opposing member receivable over said narrow diameter portion and engageable against said rearwardly facing shoulder; and means for fastening said opposing member tightly to said wand member when said opposing member and said wand member are in engagement with said rearwardly facing and forwardly facing shoulders, respectively, to interchangeably hold at least two different expanded diameter portions therebetween, each of said expanded diameter portions having a different diameter.

\* \* \* \* \*